United States Patent [19]

Aotsu et al.

[11] Patent Number: 4,849,907
[45] Date of Patent: Jul. 18, 1989

[54] DRAW PROCESSING METHOD AND APPARATUS

[75] Inventors: Hiroaki Aotsu, Yokohama; Toshihiko Ogura, Ebina; Koichi Kimura, Yokohama; Tadashi Kuwabara, Hitachi; Yuuichi Makaya, Hadano, all of Japan

[73] Assignee: Hitachi, Ltd., Tokyo, Japan

[21] Appl. No.: 848,459

[22] Filed: Apr. 7, 1986

[30] Foreign Application Priority Data

Apr. 8, 1985 [JP] Japan .................................. 60-72610

[51] Int. Cl.⁴ ............................................. G06F 3/153
[52] U.S. Cl. ..................... 364/518; 364/521; 340/747
[58] Field of Search ............... 364/521, 520, 522, 518; 340/721, 723, 747

[56] References Cited

U.S. PATENT DOCUMENTS

| | | | |
|---|---|---|---|
| 3,639,736 | 2/1972 | Sutherland | 340/721 X |
| 4,146,925 | 3/1979 | Green et al. | 364/521 |
| 4,209,832 | 6/1980 | Gilham et al. | 364/521 |
| 4,291,380 | 9/1981 | Rohner | 364/522 |
| 4,412,296 | 10/1983 | Taylor | 364/521 |
| 4,586,036 | 4/1986 | Thomason et al. | 340/721 X |

FOREIGN PATENT DOCUMENTS 203550 11/1983 Japan .

OTHER PUBLICATIONS

"Algorithm for Computer Control of a Digital Plotter", Bresenham, J. E., IBM System Journal, vol. 4, No. 1, pp. 25-30, 1965.

Primary Examiner—Gary V. Harkcom
Assistant Examiner—Mark K. Zimmerman
Attorney, Agent, or Firm—Antonelli, Terry & Wands

[57] ABSTRACT

In a draw processing apparatus for drawing a character, pattern or image; a segment element of a horizontal or vertical continuous run length, a coordinate of a start point of the segment and a direction coefficient of the segment are calculated, a boundary coordinate of a draw area in which a data is to be drawn is calculated in accordance with a position and a size of the draw area, a valid portion and an invalid portion of the segment are calculated for each segment element for the result first calculation result in accordance with the second calculation result, and the valid segment portion is drawn in accordance with the first calculation result.

4 Claims, 7 Drawing Sheets

① 1ST POINT $$D_1 = \frac{\Delta Y}{\Delta X} - \frac{1}{2}$$

IF $D_1 \geq 0$  RIGHT UPWARD
IF $D_1 < 0$  RIGHTHAND

ⓘ i-TH POINT (i) IF $D_{i-1} \geq 0$ $$D_i = D_{i-1} + \frac{\Delta Y}{\Delta X} - 1$$

(ii) IF $D_{i-1} < 0$ $$D_i = D_{i-1} + \frac{\Delta Y}{\Delta X}$$

$\Delta X = 22$ $\Delta Y = 5$ $\dfrac{\Delta X}{\Delta Y} = 4.4 \longrightarrow R = 4,\ \Delta R = 0.4$ $\dfrac{\Delta X}{2\Delta Y} = 2.2 \longrightarrow r = 2,\ \Delta r = 0.2$

DRAW PROCESSING METHOD AND APPARATUS

BACKGROUND OF THE INVENTION

The present invention relates to draw processing method and apparatus, and more particularly to draw processing method and apparatus having a draw function suitable to high speed clipping of a horizontal or vertical line segment.

In a prior art draw processing apparatus such as that disclosed in Japanese Unexamined Patent Publication No. 58-203550 when a line segment AB to be drawn having a gradient in a range of 0°–45° is drawn by using a Bresenham algorithm (see "Algorithm for Computer Control of a Digital Plotter", Bresenham, J. E., IBM System Journal, Vol. 4, No. 1, pages 25-30, 1965) for line generation shown in FIG. 1, coordinates of a series of dot points constituting the line segment $\overrightarrow{AB}$ are sequentially generated based on a rule that a point to be plotted next to a point A is either a righthand point or a right upward point.

If the draw processing is completed by plotting all of the series of coordinate points thus generated, there would be no problem. Usually, however, a rectangular area of a predetermined draw area as shown by a hatched area in FIG. 2 is given and only the series of coordinate points within this area are plotted and the coordinate points beyond this area are inhibited for plotting (clipping). In such clipping, a 4-bit area code is generated based on two-dimension coordinates (xi, yi) of the generated coordinate point P and position information LX, TY, RX and BY of the draw rectangular area, and if all of the four bits are zero, the coordinate point P is plotted and in other cases, the plotting is inhibited. This can be attained by a circuit shown in FIG. 3. Of the four bits of the area code, TC is a flag to indicates that the coordinate point xi, yi is above the area, BC is a flag to indicate that it is below the area, LC is a flag to indicate that it is on the left of the area, and RC is a flag to indicate that it is on the right of the flag.

On the other hand, in a graphic pattern generation algorithm which can process faster than the Bresenham algorithm shown in FIG. 1, horizontally (or vertically) continuous series of coordinate points shown in FIG. 4 are handled as a horizontal (or vertical) segment and a graphic pattern is drawn by specifying a start coordinate of the segment and a segment length (run length). In this algorithm, if the gradient is smaller than 45° as shown in FIG. 4, an increment ΔY on a Y coordinate is smaller than an increment ΔX on an X coordinate, and the increment ΔX on the X coordinate is distributed to grid pitches of the Y coordinate where the increment on the X coordinate per grid pitch of the Y coordinate is equal to the run length of the segment. Since the increment per grid pitch is usually not an integer, it is represented by a formula shown in FIG. 4 where R is an integer part and ΔR is a fraction part. At the opposite ends of the line, ΔX/2ΔY is used to half the decrement. Since the run length must be an integer, an error is generated if R is used as the run length when ΔR is not zero. When an accumulation of the error exceeds 1, the run length is set to R+1 and in other cases, it is set to R. In this manner, the sloped line shown in FIG. 4 is drawn.

In order to aid the understanding of the algorithm, the example shown in FIG. 4 is explained. Since ΔX=22 and ΔY=5, R=4 and ΔR=0.4. At the ends of the line, they are divided by two and r=2 and Δr=0.2. Thus, the run length of the first segment is 2, but since the start point is not included, 1 is added so that the run length is equal to 3. The error is equal to Δr or 0.2. The run length of the next segment is equal to R or 4 because the error is equal to Δr+ΔR=0.6 which is smaller than 1. The run length of the third segment is equal to R+1 or 5 because the error is equal to 0.6+ΔR=1. Since the error exceeding 1 is reflected to the run length, the fraction portion of 0 is the error. The above steps are repeated until the end point is reached to obtain the result shown in FIG. 4. Unlike the Bresenham algorithm in which individual coordinates are determined, this algorithm determines the start positions of the horizontal segments and the lengths thereof and hence provides a higher coordinate determination efficiency.

Accordingly, the output data for the graphic pattern generation algorithm in which the coordinate is determined for the horizontal or vertical segment include the coordinate point P (xi, yi), run length R and direction coefficient D (horizontal segment or vertical segment), as a result, in the example of FIG. 4, six coordinate calculations are required compared to 22 coordinate calculations in the case of the Bresenham algorithm, and only the horizontal or vertical lines needs to be drawn. Thus, a fast processing is achieved.

However, as shown in FIG. 2, if only a portion of the screen can be drawn and the clipping is done for each of the coordinate points shown in FIG. 3, the horizontal or vertical segment is converted to a series of points and the clipping is done for each point. As a result, 22 coordinate points are calculated as are done in the Bresenham algorithm and the drawing performance is not improved.

SUMMARY OF THE INVENTION

It is an object of the present invention to provide draw processing method and apparatus in which clipping to draw only a portion of a given size of pattern in a predetermined draw area is done at a high speed.

In order to achieve the above object, based on the fact that the sequence of draw points of the draw processing apparatus of the present invention are handled as an aggregation of horizontal or vertical segments, the draw processing is divided into segment elements having start point coordinates P (x, y), run length R and direction Dir (horizontal or vertical) from plots of the draw points and they are clipped to draw.

The draw processing apparatus for drawing characters, patterns or images comprises first means for calculating a horizontal segment element of ri horizontally continuous pixels or a vertical segment element of ri' vertically continuous pixels, a coordinate P (xi, yi) of a start point of the horizontal or vertical segment element and a direction coefficient (right to left, left to right, top to down, down to top) of the segment, second means for calculating boundary coordinates of a draw area based on a position of the area in which the data is drawn and an area size, third means for calculating a valid segment portion and an invalid segment portion for each segment element based on the calculation result of the second means, and fourth means for drawing the valid horizontal or vertical segment portions based on the calculation result of the third means.

DESCRIPTION OF THE PREFERRED EMBODIMENTS

A basic principle of the present invention is explained with reference to FIG. 5.

Figure 5:
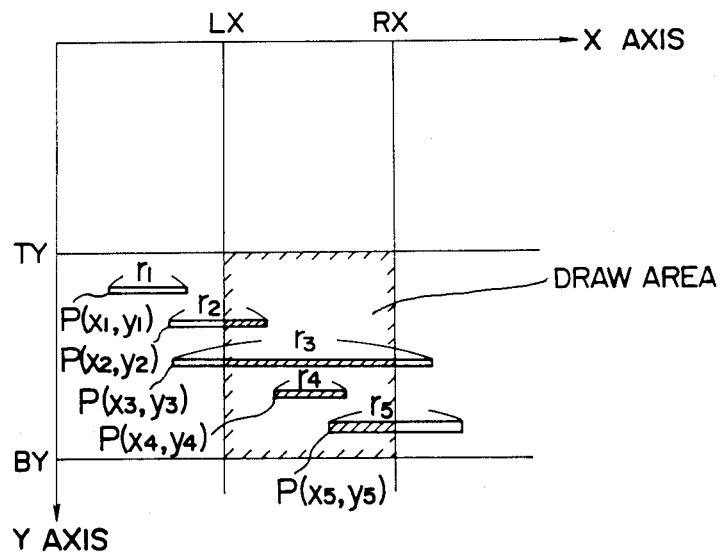
FIG. 5 illustrates a basic principle of clipping in the prsent invention.

A relationship between any horizontal segment having a horizontal run length $r_i$ from a point P ($x_i$, $y_i$) and a draw area (clipping area) is classified so that the horizontal segment is one of the following five kinds of horizontal segments (as shown in FIG. 5); that is, ①A segment the whole of which need not be drawn (P ($x_1$, $y_1$) $r_1$) (generally, the case of $y_i < TY$ or $y_i > BY$ or ($x_i + r_i$) $< LX$ or ($x_i + r_i$) $> RX$), ②a segment the whole of which is to be drawn (P ($x_4$, $y_4$), $r_4$) (generally, the case of $TY \leq y_i \leq BY$ and $x_i \geq LX$ and ($x_i + r_i$) $\leq RX$, ③a segment of only a fore portion first half of which is to be drawn (P ($x_5$, $y_5$), $r_5$) (generally, the case of $TY \leq y_i \leq BY$ and $LX \leq x_i \leq RX$ and ($x_i + r_i$) $> RX$), ④a segment of only a rear portion second half of which is to be drawn in the draw area with the whole of the rear portion being to be drawn being (P ($x_2$, $y_2$), $r_2$) (generally, the case of $TY \leq y_i \leq BY$ and $x_i < LX$ and $LX \leq (x_i + r_i) \leq RX$), ⑤a segment of only a center portion of which is to be drawn in the draw area with the center portion to be drawn being (P ($x_3$, $y_3$), $r_3$) (generally, the case of $TY \leq Y_i \leq BY$ and $x_i < LX$ and ($x_i + r_i$) $> RX$)

Figure 1:
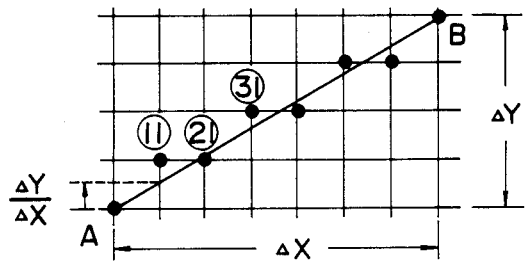
FIG. 1 illustrates a Bresenham algorithm for line generation.
Figure 1:
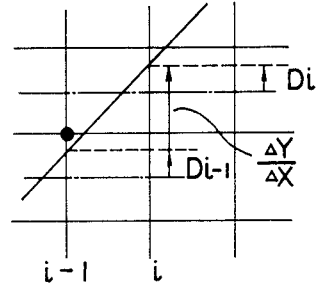
Figure 1:
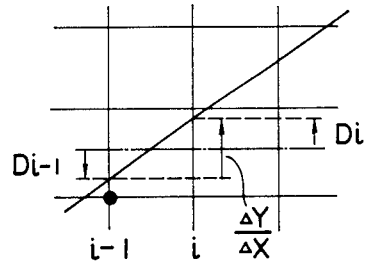
Figure 2:
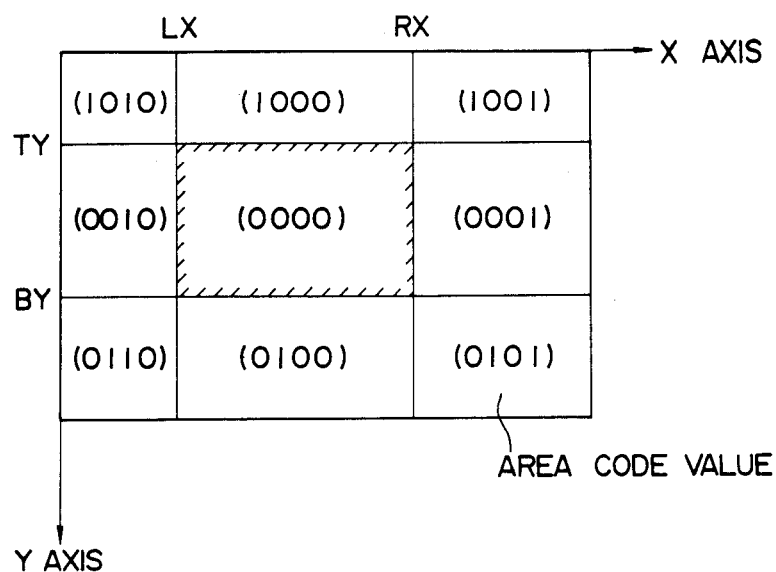
FIG. 2 illustrates conventional clipping.
Figure 3:
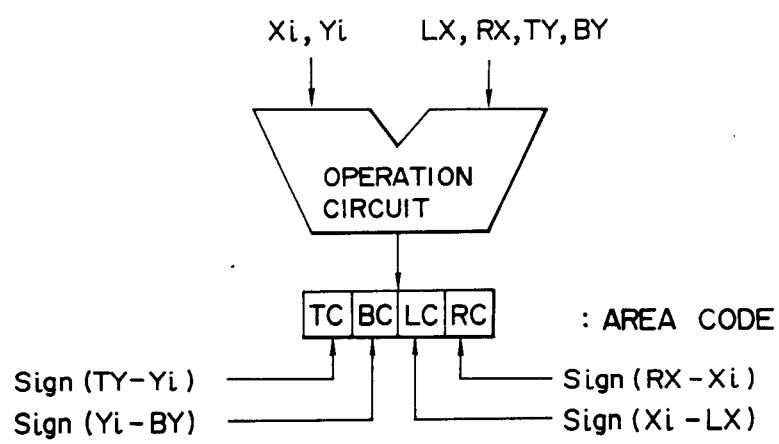
FIG. 3 illustrates an operation of a conventional clipping logical operation circuit.
Figure 4:
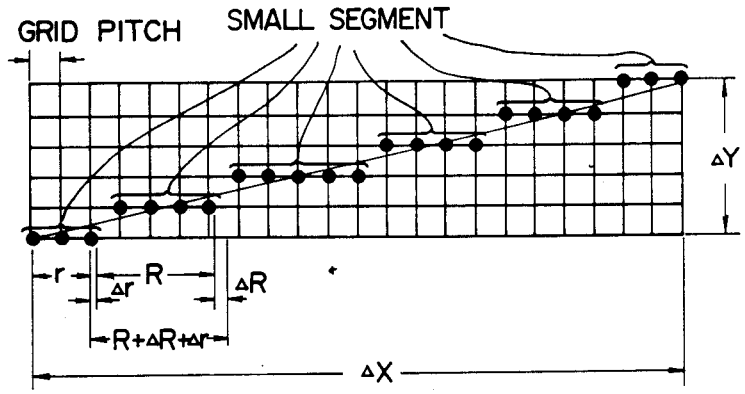
FIG. 4 illustrates an algorithm for generating a line by horizontal or vertical segments.

By using the above classification for any segment having a run length $r_i$, a run length $S_i$ to be skipped and a run length $R_i$ to be drawn (where $S_i$ and $R_i$ meet $S_i + R_i \leq r_i$) are calculated based on the segment position P ($x_i$, $y_i$) and run length $r_i$ calculated by the algorithm shown in FIG. 4, and the position and size of the draw area.

Figure 6:
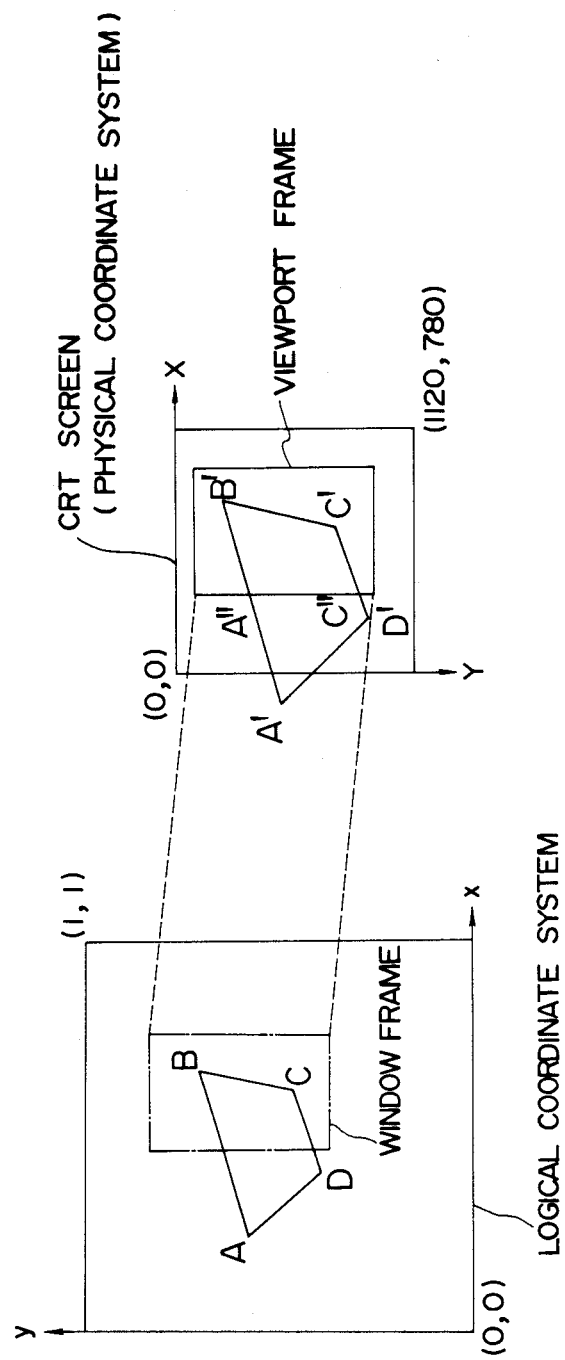
FIG. 6 is a conceptual view of image processing of the draw processing system.
Figure 7:
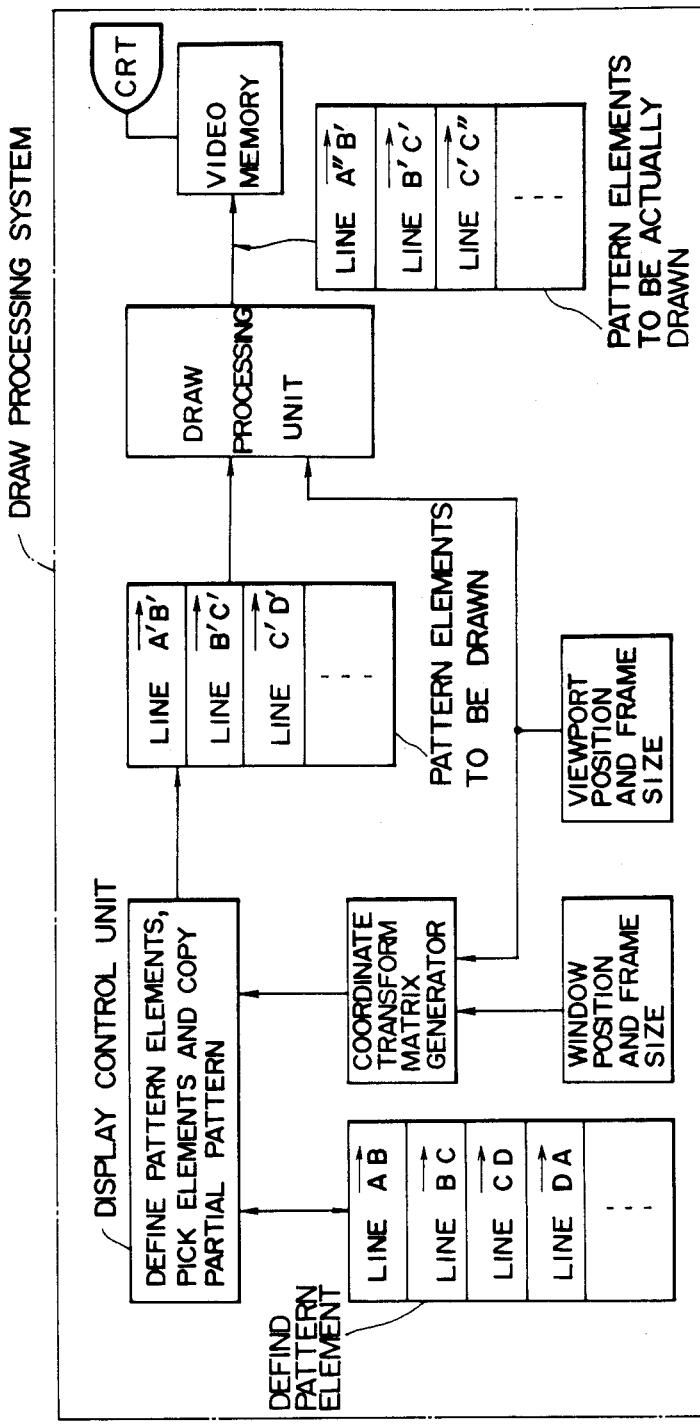
FIG. 7 is a block diagram of the draw processing system.

FIG. 6 is a conceptual view for displaying a graphic pattern defined in a logical coordinate space in a draw processing system onto a physical device such as a CRT, and FIG. 7 is a block diagram of a draw processing system.

The basic operation of the draw processing system is explained as follows with reference to FIGS. 6 and 7.

In the draw processing apparatus, pattern elements of lines, planes or characters which are units of the pattern to be drawn are defined by a logical coordinate space (for example, normalized coordinate system represented by a size (0.0)~(1,1) shown in FIG. 6). When the pattern represented by the logical coordinate space is to be displayed on a physical device such as a CRT, a rectangular frame called a window is set in the logical coordinate space and image data which is a copy of the partial pattern displayed in the window is generated by the display control unit. When the partial pattern displayed in the window is copied, a viewport mechanism is available by which a user can specify a display position on the CRT screen and a size of the image. The viewport control operation is attained by affine-transforming the coordinates of the pattern elements which are included in the window frame at least partially in accordance with relationships between the position and size of the window frame set on the logical coordinate space, and the position and size of the viewport frame set on the physical coordinate space, supplying the transformed coordinates to the draw processing apparatus to cause the video memory which actually stores the CRT screen data to draw the image.

More specifically, in FIGS. 6 and 7, assuming that the user defines pattern elements or line segments $\overrightarrow{AB}$, $\overrightarrow{BC}$, $\overrightarrow{CD}$ and $\overrightarrow{DA}$ to the display control apparatus and sets a positional relationship between the window frame and the viewpoint frame as shown in FIG. 6, the partial pattern copy control circuit in the display control unit discriminates the pattern elements or line segments to determine whether the segment is one having at least a portion thereof included in the window frame (the segments AB, BC and CD in the case of FIG. 6) or one having no portion thereof included in the window frame, (the segment DA in the case of FIG. 6) in accordance with the positional relationship between the defined segments $\overrightarrow{AB}$, $\overrightarrow{BC}$, $\overrightarrow{CD}$ and $\overrightarrow{DA}$ and the window frame (This is usually called picking of the pattern element.) Then, based on the output of the partial pattern copy circuit, a coordinate transform matrix determined by the positions and sizes of the window frame and the viewport frame is multiplied to the logical coordinates of the segments $\overrightarrow{AB}$, $\overrightarrow{BC}$ and $\overrightarrow{CD}$ which are included in the window frame (picked pattern elements). This is called the affine transform. In this manner, the pattern elements which are copies in the physical coordinate system of the pattern elements to be drawn, that is, the segments $\overrightarrow{A'B'}$, $\overrightarrow{B'C'}$ and $\overrightarrow{C'D'}$ are obtained. The pattern elements to be drawn and the draw area on the CRT screen (the position and size of the viewport frame) are supplied to the draw processing apparatus. The draw processing apparatus sequentially generates small segments (horizontal or vertical segments) shown in FIG. 4, one for each of the pattern elements to be drawn, clips the small segments to determine which portions of the small segments exist in the draw area shown in FIG. 5 which is determined by the relationship between the position and size of the viewport frame, and draws the portions included in the draw area, that is, segments $\overrightarrow{A''B'}$, $\overrightarrow{B'C'}$ and $\overrightarrow{C'C''}$ shown in FIGS. 6, and 7 onto the video memory.

The draw processing apparatus of the present invention in the above draw processing system is described in detail as follows.

Figure 8:
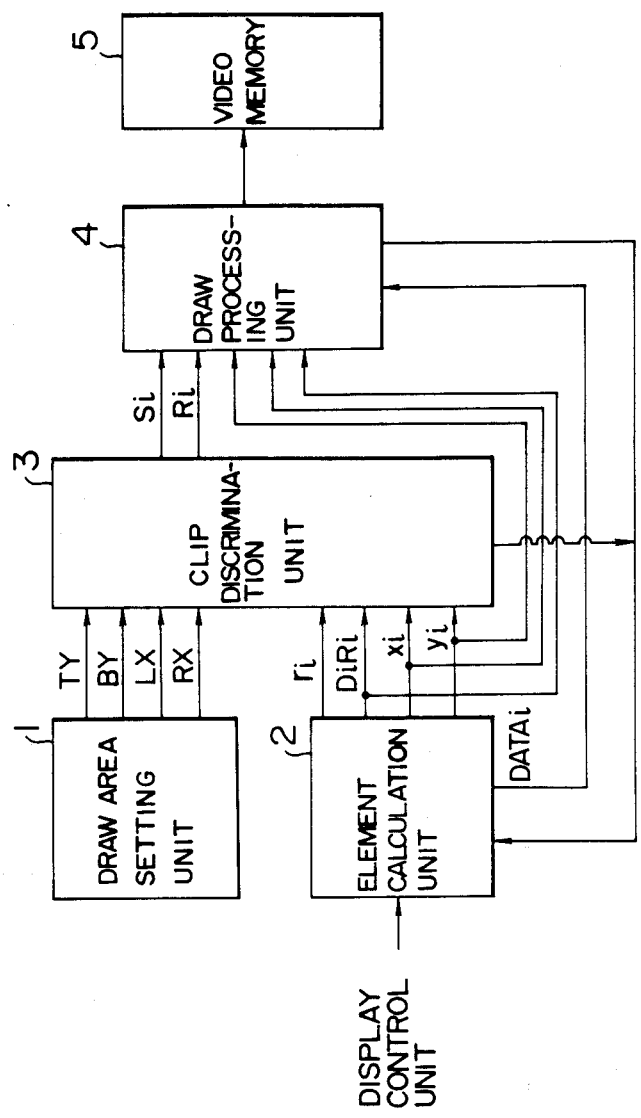
FIG. 8 is a block diagram of one embodiment of the present invention.

FIG. 8 shows a block diagram of one embodiment of the draw processing apparatus of the present invention. In FIG. 8, numeral 1 denotes a draw area setting unit, numeral 2 denotes an element calculation unit for a horizontal or vertical segment, numeral 3 denotes a clip discrimination unit for the horizontal or vertical segment, numeral 4 denotes a draw processing unit and numeral 5 denotes a video memory for a CRT.

The operation of the draw processing apparatus shown in FIG. 8 is explained. The draw area setting unit 1 generates coordinates LX and RX on an X axis and coordinates TY and BY on a Y axis shown in FIG. 5 based on the position information (for example, a coordinate of a left top corner of a rectangular area) and the size information (information on the viewport) of the draw area, and supplies them to the clip discrimination unit 3. When a vector is to be drawn, the element calculation unit 2 may be a segment data calculation unit which generates a horizontal or vertical component of the segment and a line pattern data by the algorithm shown in FIG. 4. When a character font is to be drawn, the element calculation unit 2 generates a position of raster, a width of the character font and a font pattern data. The element calculation unit 2 generates a start point coordinate P (xi, yi) of the segment element, a run length ri, a segment direction coefficient DIRi (which indicates whether the segment runs horizontally from right to left or left to right, or vertically from top to bottom or bottom to top) and a pattern data DATAi representing the run length. The clip discrimination unit 3 receives the data from the draw area setting unit 1 and the element calculation unit 2 and calculates the run length of an invalid segment Si not to be drawn and the run length of a valid segment Ri to be drawn based on the start point P (xi, yi) of the segment element P (xi, yi), ri in accordance with five classes shown in FIG. 5. Those outputs are supplied to the draw processing unit 4. The draw processing unit 4 receives P (xi, yi), DIRi, Si, Ri and DATAi from the element calculation unit 2 and the clip discrimination unit 3 and generates a physical address in the memory corresponding to the designated coordinate in the video memory 5 and draws the pattern data having the run length of Ri.

Figure 9:
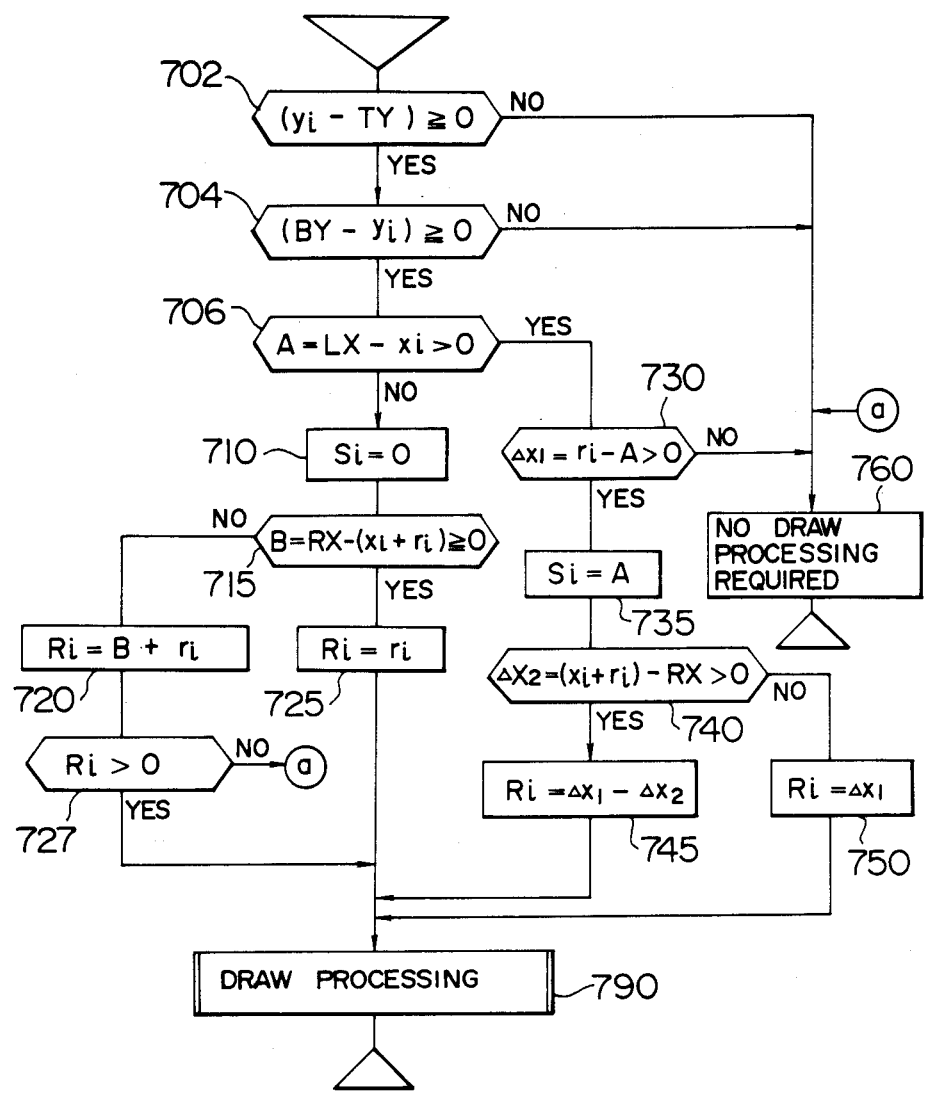
FIG. 9 is a flow chart for an operation of a clipping discriminator of the present invention.

FIG. 9 shows a flow chart of discrimination by the clip discrimination unit 3 for the horizontal segment element (having the direction coefficient DIRi of right to left) in the draw processing apparatus. In FIG. 9, the clip discrimination unit 3 discriminates whether the Y axis coordinate yi of the segment start point P (xi, yi) is $TY \leq yi \leq BY$ (702, 704), and if the condition is not met, it instructs that the draw processing is not required (760), that is, it outputs $Si=0$ and $Ri=0$. If the condition $TY \leq yi \leq BY$ is met, it compares the start point xi of the segment with the left boundary coordinate of the draw area to determine if a first half of the given horizontal segment ri is to be drawn or a second half is to be drawn (706). If $LX \geq xi$, it is determined that the segment is a segment the second half of which is to be drawn, and if $LX < xi$, it is determined that the segment is a segment the first half of which is to be drawn. Similarly, the end point X axis coordinate (xi+ri) of the segment is compared with the right boundary coordinate RX of the draw area (715, 740) and the start position Si of the segment to be drawn and the run length Ri to be drawn are calculated (710, 720, 725, 727, 735, 745, 750).

In the flow chart of FIG. 9, the class ① of the five classes shown in FIG. 5 branches to the step 760 of no draw processing required, the class ② branches to the step 725, the class ③ branches to the step 790 of draw processing if the condition is met in the step 727, the class ④ branches to the step 750 and the class ⑤ branches to the step 745.

In the present embodiment, the horizontal segment is discussed in detail, although the vertical segment can be processed in the same manner by replacing the Y axis processing with the X axis processing. In FIG. 9, TY is replaced by LX, BY is replaced by RX, yi is replaced by Xi, LX is replaced by TY, RX is replaced by BY and xi is replaced by yi so that a flow chart for the vertical segment processing is generated.

The overall operation of the draw processing apparatus is explained. The draw processing apparatus receives the draw area data from a device (not shown) which controls the draw processing apparatus, and the draw area setting unit 1 produces the coordinate data TY, BY, LX and RX based on the draw area data. Then, a draw request is issued to the element calculation unit 2. If it is a line draw request, the element calculation unit 2 generates a horizontal or vertical segment data represented by a first coordinate xi, yi, a run length ri and a direction coefficient DIRi in accordance with the algorithm shown in FIG. 4 and supplies it to the clip discrimination unit 3 and the draw processing unit 4. The clip discrimination unit 3 carries out the clip discrimination shown in the flow chart of FIG. 9, and if no draw processing is required, informs the element calculation unit 2 of the end of segment drawing. If the draw processing is required, it supplies the skip run length Si and the draw run length Ri to the draw processing unit 4 to start the draw processing. The draw processing unit 4 writes the portion of the image to be drawn having the run length Ri into the video memory 5, and then informs the element calculation unit 2 of the end of draw processing. When the element calculation unit 2 is informed of the end of draw processing, it calculates the next segment coordinate (xi, yi), run length ri and direction coefficient DIRi and supplies the data to the clip discrimination unit 3 and the draw processing unit 4. The above operation is repeated until all of the required segments are drawn, and the end of drawing of one line is informed to the element calculation unit 2. Then, the next draw request is waited for.

In the present embodiment, the draw process for the line is explained, although a curve may be drawn in a similar manner. A portion of the curve may be considered as a line and the curve may be represented by an aggregation of horizontal segments and vertical segments. Thus, the same clip discrimination can be applied when the curve is drawn by the horizontal or vertical segments in accordance with a curve coordinate generation algorithm.

In accordance with the present embodiment, the clipping to a series of the coordinate points having the run length ri can be attained by one chip discrimination procedure. This means that the number of times of clip discrimination is reduced to 1/ri as compared with the conventional method in which the clipping to only one coordinate point is effected by one clip discrimination procedure. Also, the time required for one clip discrimination procedure in the present embodiment is approximately the same as the time required for the clip discrimination in the case of ri=1. Accordingly, a processing speed which is approximately ri times as fast as that of the prior art method is attained in the present embodiment. Further, since the output request to the draw processing unit is not a plot output for each point but a parallel output for the run length Ri, the efficiency of the draw processing unit is improved.

Hardware may be of essentially same scale as that of the prior art apparatus and hence a cost/performance is significantly improved.

As described hereinabove, in accordance with the present invention, the clip discrimination is effected for each unit of horizontally or vertically continuous run length. Accordingly, the processing speed is approximately ri times as high as that of the conventional method in which the clip discrimination is effected for each coordinate point. The number of times of operation of the draw processing unit is equal to the number of segments in the present invention while it is equal to the number of coordinate points to be drawn in the conventional method. Accordingly, the draw speed is significantly improved.

We claim:

1. A draw processing method for drawing a character, pattern or image comprising:

a first step of defining the character, pattern or image to be drawn as an aggregation of horizontal or vertical segment elements each continuously extending with a certain run length in a horizontal or vertical direction, and determining, for each horizontal or vertical segment element, data including a coordinate value of a start point of the segment element, a length of the segment element and a direction coefficient of the segment element;

a second step of using the data of the respective horizontal or vertical segment elements determined at said first step and information concerning a position and size of a predetermined draw area in which the character, pattern or image is to be drawn, to determine, for each horizontal or vertical segment element, a valid portion of the segment element which falls within said predetermined draw area and an invalid portion thereof which does not fall within said predetermined draw area; and a third step of drawing the valid portions of the horizontal or vertical segment elements in accordance with the data determined at said first step and a result of the determination at said second step.

2. A draw processing method according to claim 1, wherein said second step includes a first phase of discriminating whether each horizontal or vertical segment element is one having a portion which is valid or one whole of which is invalid, based on the data determined at said first step and the information concerning the position and size of said predetermined draw area, and a second phase of performing a clip/discrimination for each horizontal or vertical segment element discriminated as having a valid portion at said first phase, to calculate an amount of deviation of a start position of the valid portion of the segment element from the coordinate value of the start point of the segment element and a length of the valid portion of the segment element from said start position of the valid portion.

3. A draw processing apparatus for drawing a character, pattern or image comprising:

first means for defining the character, pattern or image to be drawn as an aggregation of horizontal or vertical segment elements each continuously extending with a certain run length in a horizontal or vertical direction, and determining, for each horizontal or vertical segment element, data including a coordinate value of a start point of the segment element, a length of the segment element and a direction coefficient of the segment element;

second means for receiving the data of the respective horizontal or vertical segment elements from said first means and information concerning the position and size of a predetermined draw area in which the character, pattern or image is to be drawn, to determine, for each horizontal or vertical segment element, a valid portion of the segment element which falls within said predetermined draw area and an invalid portion thereof which does not fall within said predetermined draw area; and third means for drawing the valid portions of the horizontal or vertical segment elements in accordance with the data determined by said first means and the result of determination by said second means.

4. A draw processing apparatus according to claim 3, wherein said second means includes area discrimination means for determining whether each horizontal segment elements is one having a portion which is valid or one whole of which is invalid, based on the data determined by said first means and the information concerning the position and size of said predetermined draw area, and clip discrimination means for performing a clip discrimination for each horizontal or vertical segment element discriminated as having a valid portion by said area discrimination means, to calculate an amount (Si) of deviation of a start position of the valid portion of the segment element from the coordinate value of the start point of the segment element and a length (Ri) of the valid portion of the segment element from said start position of the valid portion.

* * * * *